(12) United States Patent
Bergmann et al.

(10) Patent No.: US 8,864,966 B2
(45) Date of Patent: Oct. 21, 2014

(54) COATING MASK FOR ELECTROLYTICALLY COATING A PERIPHERAL REGION ON AN OUTER SURFACE OF A CYLINDRICAL BODY

(75) Inventors: Rudolf Bergmann, Alzenau (DE); Christopher Rotsch, Barcelona (ES); Franz Gessler, Barcelona (ES)

(73) Assignee: MAHLE International GmbH, Stuttgart (DE)

( * ) Notice: Subject to any disclaimer, the term of this patent is extended or adjusted under 35 U.S.C. 154(b) by 913 days.

(21) Appl. No.: 12/737,785

(22) PCT Filed: Aug. 19, 2009
(Under 37 CFR 1.47)

(86) PCT No.: PCT/DE2009/001167
§ 371 (c)(1),
(2), (4) Date: Sep. 26, 2011

(87) PCT Pub. No.: WO2010/020235
PCT Pub. Date: Feb. 25, 2010

(65) Prior Publication Data
US 2012/0085654 A1 Apr. 12, 2012

(30) Foreign Application Priority Data

Aug. 19, 2008 (EP) .......................... 10 2008 038 323

(51) Int. Cl.
*B23H 7/26* (2006.01)
*B23H 11/00* (2006.01)
*C25B 9/00* (2006.01)
*C25C 7/00* (2006.01)
*C25D 17/00* (2006.01)
*C25F 7/00* (2006.01)
*C23C 14/00* (2006.01)
*C25B 11/00* (2006.01)
*C25B 13/00* (2006.01)
*C25D 5/02* (2006.01)
*C25D 7/10* (2006.01)
*F16J 9/26* (2006.01)

(52) U.S. Cl.
CPC ... *F16J 9/26* (2013.01); *C25D 7/10* (2013.01); *C25D 5/022* (2013.01)
USPC ............ 204/297.05; 204/297.14; 204/298.15; 205/118; 205/122; 205/121; 205/135

(58) Field of Classification Search
CPC ............ C25D 5/02; C25D 5/022; C25D 7/04; C25D 11/02; C25D 11/004; C25D 11/06; B05C 13/00; B05C 13/02; B05C 13/025
USPC ................. 204/286.1, 288.3, 297.01, 297.05, 204/297.14, 298.15; 205/118, 122, 324, 205/120, 121, 124, 131, 134, 135, 136; 118/428, 500, 501, 503
See application file for complete search history.

(56) References Cited

U.S. PATENT DOCUMENTS 6,821,408 B2 * 11/2004 Sasaki et al. .................. 205/324
2002/0100695 A1 8/2002 Sasaki et al.

FOREIGN PATENT DOCUMENTS

| DE | 10 2006 020 593 | 11/2007 |
| GB | 2 027 054 | 2/1980 |
| JP | 01-073080 | 3/1989 |
| WO | WO 2007/124728 | 11/2007 |

OTHER PUBLICATIONS

International Search Report of PCT/DE2009/001167, Apr. 7, 2010.
German Search Report dated Nov. 18, 2008 in German Application No. 10 2008 038 323.6 with English translation of relevant parts.

* cited by examiner

*Primary Examiner* — Luan Van
*Assistant Examiner* — Alexander W Keeling
(74) *Attorney, Agent, or Firm* — Collard & Roe, P.C.

(57) ABSTRACT

The invention relates to a coating mask (1) for electrolytically coating the piston ring groove (39) of a piston (38), which is made of an elastically deformable material and has openings (3 to 10) that are arranged axially and are distributed in a uniform manner over the periphery, into which rods (11 to 18) of an expansion device (19) can be introduced, the rods being arranged in a displaceable manner such that the expansion device (19) can increase the radial diameter of the coating mask (1) and also the inner opening (2) so that the piston (38) can be introduced into the inner opening (2). The radial diameter of the coating mask (1) is selected in such a manner that after the reduction of radial diameter of the coating mask (1) and the inner opening, the elastically tensed coating mask (1) presses sealing lips (44, 45) of the coating groove (37) against the piston (38), on both sides of the piston ring groove (39).

6 Claims, 3 Drawing Sheets

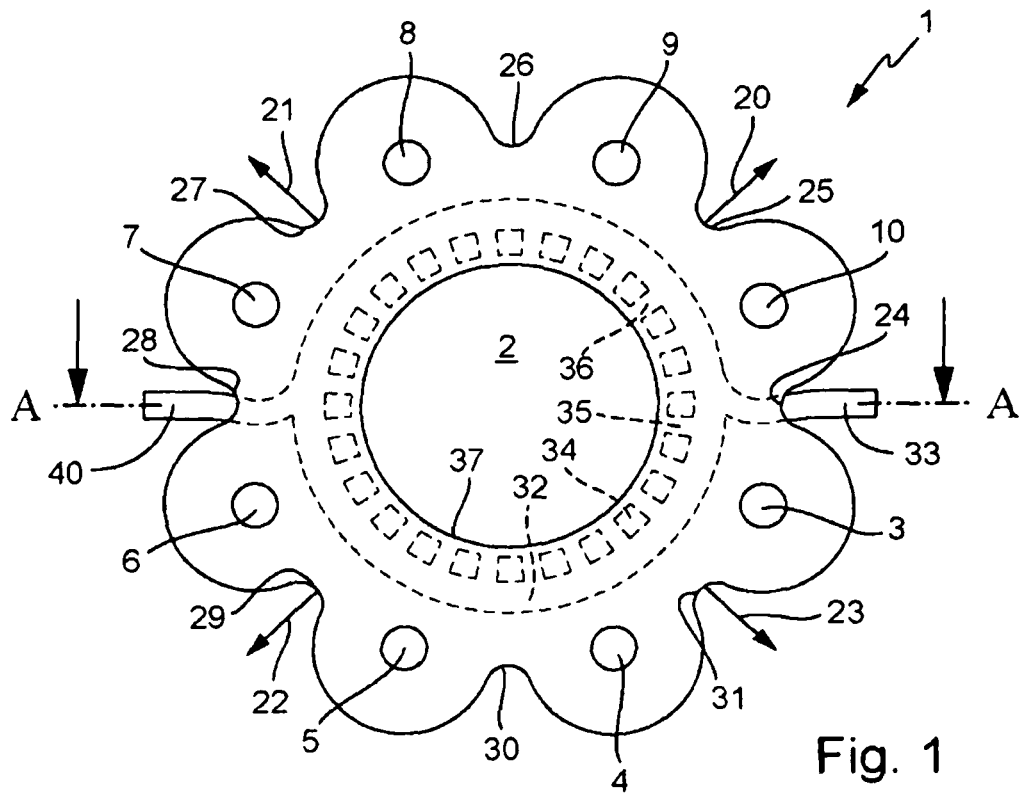
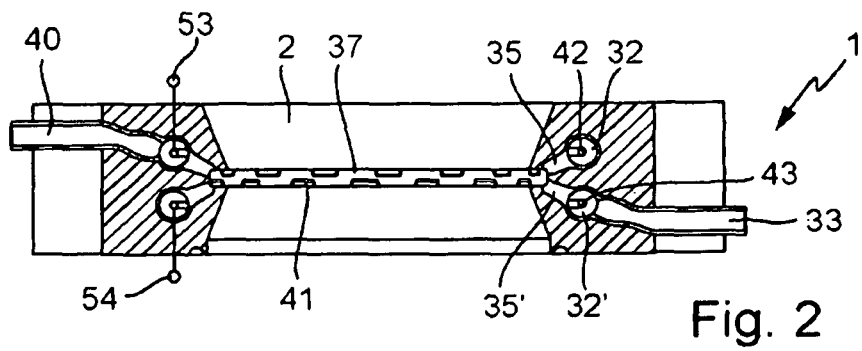
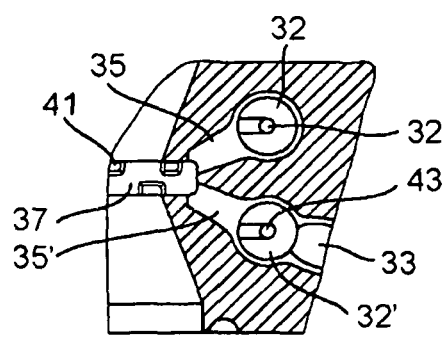

COATING MASK FOR ELECTROLYTICALLY COATING A PERIPHERAL REGION ON AN OUTER SURFACE OF A CYLINDRICAL BODY

CROSS REFERENCE TO RELATED APPLICATIONS

This application is the National Stage of PCT/DE2009/001167 filed on Aug. 19, 2009 which claims priority under 35 U.S.C. §119 of German Application No. 10 2008 038 323.6 filed on Aug. 19, 2008, the disclosure of which is incorporated by reference. The international application under PCT article 21(2) was not published in English.

The invention relates to a coating mask for electrolytic coating of a circumferential region on the mantle surface of a cylindrical body in accordance with the preamble of claim 1, and the use of the coating mask for coating of a piston ring groove of a piston for an internal combustion engine in accordance with claim 7.

A device for anodic oxidation of a circumferential region on the mantle surface of a cylindrical body, particularly the piston ring groove of a piston for an internal combustion engine, is known from the U.S. Pat. No. 6,821,408, whereby the region to be coated is hermetically sealed off, on both sides, by two circumferential sealing rings, which are at first round in section, in that pressure is exerted on the sealing rings by a sleeve, in each instance, until the sealing rings deform to become oval, whereby this ovality is oriented perpendicular to the mantle surface of the piston. In this way, the sealing rings come to lie against the mantle surface on both sides of the piston ring groove and seal this region off hermetically. Subsequently, an electrolyte is introduced into this region and the piston ring groove situated within it is anodically oxidized. It is disadvantageous that a very complicated mechanism for deformation of the sealing rings is required. In this connection, the sleeves are put into motion parallel to the piston axis, by multiple pressure rods that can be moved perpendicular to the piston axis, by way of a slanted contact surface.

It is the task of the invention to overcome this disadvantage of the state of the art. This task is accomplished with the characteristics that stand in the characterizing part of the main claim. Practical embodiments are the object of the dependent claims.

Since the coating mask according to the invention consists of an elastically resilient material, this mask merely has to be stretched outward radially, using a simple mechanism, in order to make room for a piston whose piston ring groove is supposed to be coated.

Figure 4:
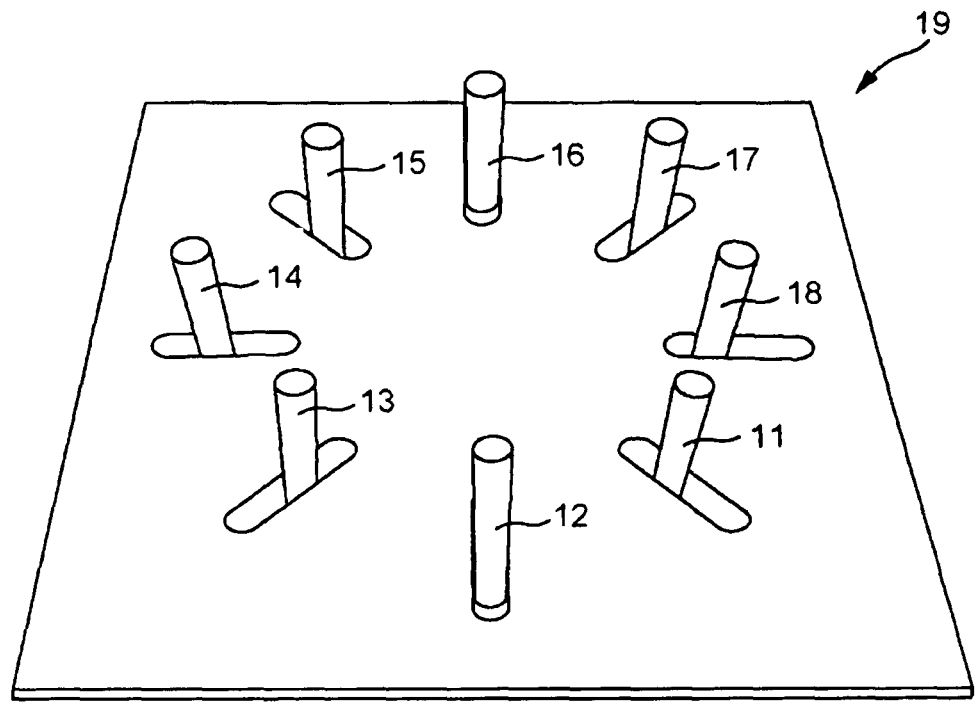
Figure 5:
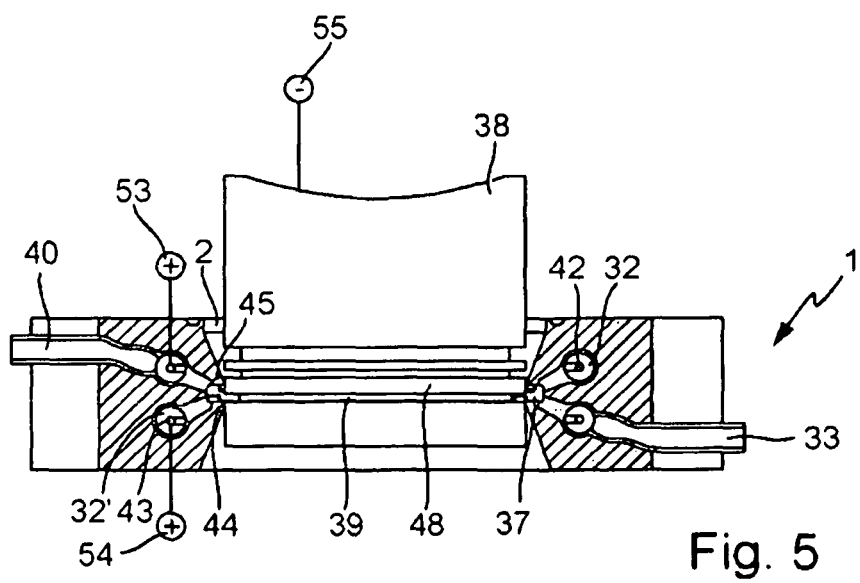
Figure 6:
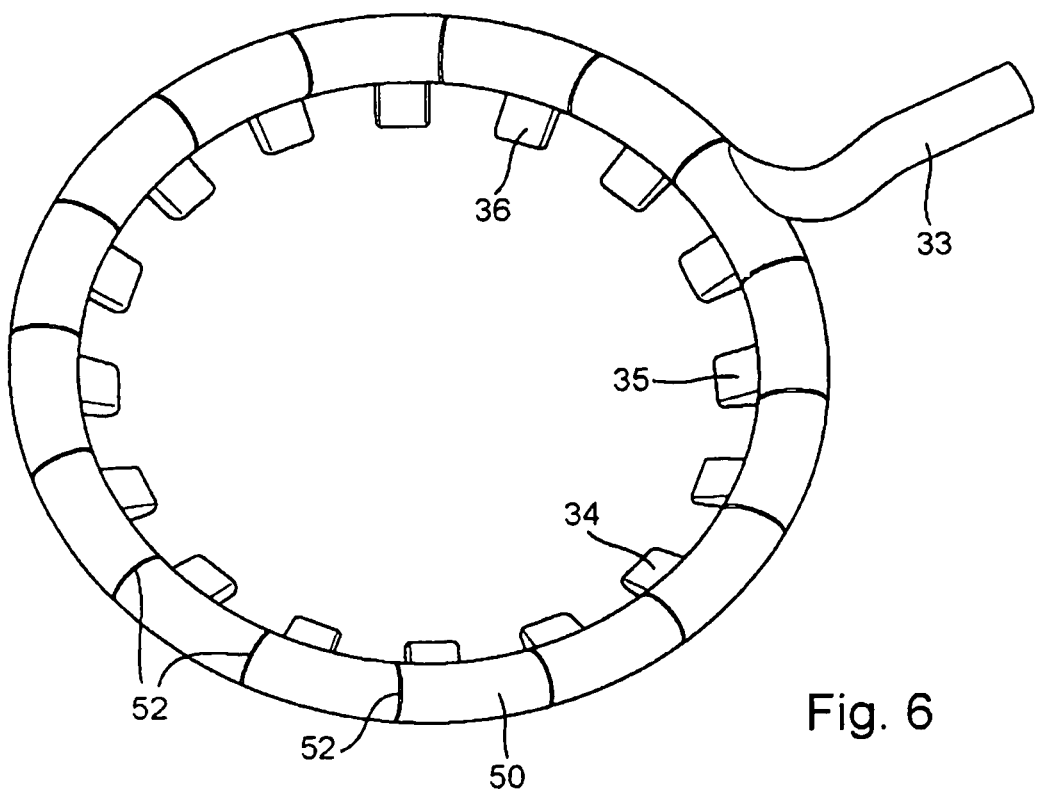
Figure 7:
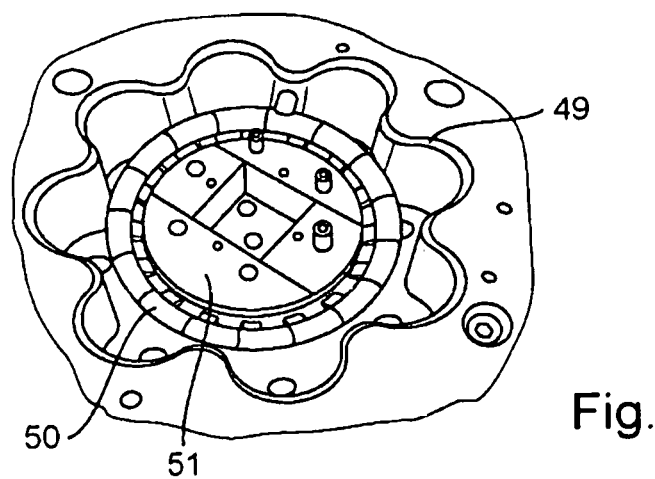

The invention will be described in the following, using the drawings. The figures show:

FIG. 1 a top view of a coating mask for piston ring grooves, in which a ring line for an electrolyte is shown with a broken line, FIG. 2 a section through the coating mask along the line AA in FIG. 1, FIG. 3 an enlarged detail of the sectional diagram shown in FIG. 2, FIG. 4 a perspective representation of a stretching device which is used to stretch the coating mask radially to the outside, in order to be able to introduce a piston, FIG. 5 a section through the coating mask, with an introduced piston, whose first piston ring groove is being coated, FIG. 6 a ring line template for production of the ring line, and FIG. 7 a casting mold with ring line template laid in, for production of the coating mask by means of casting technology.

FIG. 1 shows a coating mask 1 in a top view, having an inner opening 2 for accommodating a cylindrical body, for example a piston 38 (FIG. 5), of which a circumferential region, for example a piston ring groove 39 (FIG. 5) is supposed to be coated. The coating mask 1 consists of rubber, preferably of silicone, and has eight axially placed openings 3 to 10 uniformly distributed over its circumference, whose purpose, as will be explained in greater detail further below, consists in accommodating mandrels 11 to 18 of a stretching device 19 (FIG. 4), which are used to stretch the coating mask 1 in the direction of the arrows 20 to 23, so that in this way, the inner opening 2 is also enlarged, and afterwards, a piston can be introduced into the inner opening 2.

Between the openings 3 to 10, the coating mask 1 has regions 24 to 31 having a thinner wall, which regions increase the elasticity of the coating mask 1, so that the coating mask 1 can be stretched more easily in the direction of the arrows 20 to 23.

In FIG. 1, a ring line 32 is shown with a broken line; an electrolyte can be passed to this line by way of an inflow channel 33. The electrolyte then gets into a circumferential coating groove 37, by way of feed channels 34, 35, 36 . . . ; this groove is sealed off, as FIG. 5 shows, by the piston ring groove 39 of a piston 38, which is supposed to be coated. Subsequently, the electrolyte is passed out of the coating mask 1 by way of an outflow channel 40.

FIGS. 2 and 3 are sections along the line AA in FIG. 1 and show that the coating mask 1 has two ring lines 32 and 32' disposed one behind the other in the axial direction, which lines are connected with the coating groove 37, in each instance, by way of feed channels 35 and 35' distributed uniformly over the circumference. In this connection, the inner opening 2 has a shape that widens in both axial directions, in funnel shape, proceeding from the centrally located coating groove 37.

In this connection, the electrolyte gets into the lower ring line 32' by way of the inflow channel 33, flows into the coating groove 37 that is closed off by the piston to be coated, by way of the lower feed channels 35', from here into the upper ring line 32, by way of the upper feed channels 35, and is passed out of the coating mask 1 from here, by way of the outflow channel 40. In FIGS. 2 and 3, the exits 41 of the feed channels 35, 35' into the coating groove 37 can also be seen.

As can be clearly seen in FIGS. 2 and 3, ring electrodes 42 and 43 having electrical connectors 53 and 54 indicated schematically are disposed in the ring lines 32, 32'. The present coating mask 1 can be used for the purpose of electrolytically coating the flanks of the piston ring groove 39 of the piston 38, for example with iron. For this purpose, the ring electrodes 42 and 43 are switched as anodes, i.e. connected with the plus pole of a direct-voltage source by way of the connectors 53 and 54, and the piston 38 is switched as a cathode, i.e. connected with the minus pole of the direct-voltage source, and an electrolyte that contains iron, for example an iron solution on a sulfate basis, is introduced into the coating mask 1 by way of the inflow channel 33.

However, the coating mask 1 can also be used to anodically oxidize the flanks of the piston ring groove 39 of the piston 38. For this purpose, the piston 38 is switched as an anode, i.e. connected with the positive pole of a direct-voltage source, and the ring electrodes 42 and 43 are switched as cathodes, i.e. connected with the negative pole of a direct-voltage source by way of the connectors 53 and 54, and sulfuric acid, for example, is supplied to the coating mask 1 as an electrolyte, by way of the inflow channel 33.

If the piston ring groove 39 of a piston 38 is supposed to be coated, first the coating mask 1 is pushed onto the mandrels 11 to 18 of the stretching device 19 by way of its openings 3 to 9, as shown in FIG. 4. Subsequently, the mandrels 11 to 18 are displaced radially outward, so that the coating mask 1 is stretched in the direction of the arrows 20 to 23. Now the piston 38 is introduced into the inner opening 2, which has been widened as a result of this, and afterwards, the mandrels 11 to 18 are moved so far radially inward until the sealing lips 44 and 45, by which the coating groove 37 is delimited, come to lie against the mantle surface of the body, here against the ring belt 48 of the piston 38, on both sides of the piston ring groove 39 to be coated, as shown in FIG. 5, and thus hermetically seal off the coating groove 37 and the piston ring groove 39 of the piston 38 to be coated.

Subsequently, if the flanks of the piston ring groove 39 are supposed to be coated with iron, an electrolyte that contains iron is introduced into the coating mask 1 by way of the inflow channel 33, the ring electrodes 42 and 43 are connected with the plus pole of a direct-voltage source by way of the electrical connectors 53 and 54, the piston 38 is connected with the minus pole of the direct-voltage source by way of an electrical connector 55, and the excess electrolyte is passed out of the coating mask 1 by way of the outflow channel 40.

After a certain period of time, the flanks of the piston ring groove 39 of the piston 38 are coated to a sufficient degree, so that after the electrolyte was completely passed out of the ring lines 32 and 32', the ring lines 32 and 32' and the coating groove 37 are flushed with hot steam, heated to 130° C. Subsequently, the mandrels 11 to 18 of the stretching device 19 are moved radially outward, so that the diameter of the inner opening 2 is also enlarged, and the piston 38 can be removed from the coating mask 1.

The coating mask 1 is produced using a casting method, whereby first, two ring line templates 50 that consist of sintered plastic are laid into a casting mold 49, as shown in FIG. 7; one of these templates is shown in FIG. 6. The ring line template 50 according to FIG. 6 shows the inflow channel 33 and feed channels 34, 35, 36, . . . . In the casting mold 49 according to FIG. 7, the feed channels 34 to 36 stand in connection with a casting core 51, which guarantees, by means of its special shape, that the inner opening 2 and the coating groove 37 are formed completely during the casting process.

The ring line templates 50 remain in the coating mask 1 after the casting process, and have planned breaking points 52 that break open during the first coating process, when the coating mask 1 and therefore also the ring line template 50 are widened radially outward for the first time, so that in this way, the elasticity of the coating mask 1 is not hindered. It is advantageous to install one ring electrode, in each instance, into the ring line templates 50, during the production of the ring line templates 50.

REFERENCE SYMBOL LIST 1 coating mask
2 inner opening
3 to 10 opening
11 to 18 mandrel
19 stretching device
20 to 23 arrow
24 to 31 region
32, 32' ring line
33 inflow channel
34 to 36 feed channel
37 coating groove
38 piston, cylindrical body, body
39 piston ring groove of the piston 38, circumferential region
40 outflow channel
41 exit
42, 43 electrode, ring electrode
44, 45 sealing lip
48 ring belt of the piston 38, mantle surface of the body
49 casting mold
50 ring line template
51 casting core
52 planned breaking point
53, 54, 55 electrical connector

The invention claimed is:

1. Coating mask (1) for electrolytic coating of a circumferential region (39) on a mantle surface (48) of a cylindrical body (38) composed of metal,
   having an inner opening (2) whose diameter is at least approximately the same as the diameter of the cylindrical body (38),
   having two sealing lips (44, 45) composed of elastically resilient material, disposed in the inner opening (2), that run around the circumference and delimit a coating groove (37) on both sides, which lips can be brought into contact with the cylindrical body (38) on both sides of the circumferential region (39), and then hermetically seal off the coating groove (37) that lies against the circumferential region (39), so that an electrolyte can be passed through the coating groove (37), and
   having at least one electrode (42, 43) that is in contact with the electrolyte, which electrode can be connected with the pole of the direct-voltage source,
Wherein
   The coating mask (1) consists of an elastically resilient material and has axially placed openings (3 to 10) uniformly distributed over the circumference, into which openings mandrels (11 to 18) of a stretching device (19) can be introduced, the mandrels (11 to 18) are movably mounted to the extent that the radial diameter of the coating mask (1) and thus of the inner openings (2) can be enlarged by the stretching device (19), to such an extent that the cylindrical body (38) can be introduced into the inner opening (2), whereby the radial diameter of the coating mask (1) is selected in such a manner that after a reduction in size of the radial diameter of the coating mask (1) and thus of the inner opening (2), the elastically biased coating mask (1) presses the sealing lips (44, 45) of the coating groove (37) against the body (38) on both sides of the circumferential region (39).

2. Coating mask (1) according to claim 1, wherein the coating mask (1) consists of rubber.

3. Coating mask (1) according to claim 1, wherein the coating mask (1) consists of silicone.

4. Coating mask (1) according to claim 1, wherein the coating mask (1) has regions (24 to 31) having a thinner wall, as compared with the regions of the openings (3 to 10), between the openings (3 to 10).

5. Coating mask (1) according to claim 1, wherein the coating mask (1) has at least one circumferential ring line (32) between the coating groove (37) and the openings (3 to 30), and wherein the circumferential ring line is connected with the coating groove (37) by way of feed channels (34, 35, 36), and with an inflow channel (33) for supplying the electrolyte, and with an outflow channel (40) for passing out the electrolyte.

6. Coating mask (1) according to claim 5, wherein the electrode (42, 43) is configured as a circumferential ring electrode and disposed in the interior of the ring line (32).

* * * * *